(12) United States Patent
Soeda et al.

(10) Patent No.: US 12,049,066 B2
(45) Date of Patent: Jul. 30, 2024

(54) COMPOSITE OF THERMALLY-MODIFIED POLYMER LAYER AND INORGANIC SUBSTRATE, COMPOSITE OF POLYMER MEMBER AND INORGANIC SUBSTRATE, AND PRODUCTION METHODS THEREOF

(71) Applicant: TEIJIN LIMITED, Osaka (JP)

(72) Inventors: Junshi Soeda, Osaka (JP); Yoshinori Ikeda, Osaka (JP)

(73) Assignee: TEIJIN LIMITED, Osaka (JP)

( * ) Notice: Subject to any disclaimer, the term of this patent is extended or adjusted under 35 U.S.C. 154(b) by 519 days.

(21) Appl. No.: 16/578,674

(22) Filed: Sep. 23, 2019

(65) Prior Publication Data
US 2020/0101675 A1    Apr. 2, 2020

(30) Foreign Application Priority Data

Sep. 28, 2018 (JP) .................................. 2018-184497
Mar. 27, 2019 (JP) .................................. 2019-061073

(51) Int. Cl.
*B32B 27/32* (2006.01)
*B32B 9/04* (2006.01)
(Continued)

(52) U.S. Cl.
CPC ............ *B32B 27/325* (2013.01); *B32B 9/045* (2013.01); *B32B 15/00* (2013.01); *B32B 15/08* (2013.01);
(Continued)

(58) Field of Classification Search
CPC ..... B32B 15/085; B32B 27/325; B32B 27/08; B32B 9/005; B32B 9/007; B32B 9/045;
(Continued)

(56) References Cited

U.S. PATENT DOCUMENTS

| 6,395,341 B1* | 5/2002 | Arakawa | ................ C08G 65/48 |
| | | | 427/407.1 |
| 2003/0152789 A1* | 8/2003 | Sinsel | ................... B29C 48/914 |
| | | | 428/461 |

(Continued)

FOREIGN PATENT DOCUMENTS

| CN | 101495584 A | 7/2009 |
| CN | 102712832 A | 10/2012 |

(Continued)

OTHER PUBLICATIONS

Vernon, Which Elements are Metalloids?, 2013, Journal of Chemical Education, 90, pp. 1703-1707. (Year: 2013).*

(Continued)

*Primary Examiner* — Monique R Jackson
(74) *Attorney, Agent, or Firm* — Sughrue Mion, PLLC (57) ABSTRACT

To provide a composite of thermally-modified polymer layer and inorganic substrate, a composite of polymer member and inorganic substrate, and production methods thereof, the method of the present invention for producing a composite of thermally-modified polymer layer and inorganic substrate 110 or 120 includes forming a first polymer layer on an inorganic substrate 10, and heating and thermally modifying the first polymer layer in order to bond the first thermally-modified polymer layer 20 onto the inorganic substrate. In addition, the method of the present invention for producing a composite of polymer member and inorganic substrate 210 or 220 includes producing a composite of thermally-modified polymer layer and inorganic substrate by the method of the present invention and joining the polymer member to the first thermally-modified polymer layer so that the polymer member 30 is joined to an inorganic substrate via the first thermally-modified polymer layer.

17 Claims, 1 Drawing Sheet

(51) Int. Cl.
*B32B 15/00* (2006.01)
*B32B 15/08* (2006.01)
*B32B 15/085* (2006.01)
*B32B 27/08* (2006.01)
*B32B 37/02* (2006.01)
*B32B 37/14* (2006.01)
*B32B 38/00* (2006.01)
*B32B 37/00* (2006.01)

(52) U.S. Cl.
CPC ............ *B32B 15/085* (2013.01); *B32B 27/08* (2013.01); *B32B 27/32* (2013.01); *B32B 37/02* (2013.01); *B32B 37/144* (2013.01); *B32B 38/0036* (2013.01); *B32B 2037/0092* (2013.01)

(58) Field of Classification Search
CPC ........... B32B 27/32; B32B 2/08; B32B 27/16; B32B 2250/04; B32B 2250/05; B32B 7/12; B05D 1/38; B05D 3/0254; B05D 7/544; B05D 7/546; B05D 7/584; B05D 7/586; C09D 123/0823; C09J 5/06; B29D 7/01

See application file for complete search history.

(56) References Cited

U.S. PATENT DOCUMENTS

| | | | |
|---|---|---|---|
| 2009/0283209 A1 | 11/2009 | Husemann et al. | |
| 2013/0192751 A1* | 8/2013 | Arai | B29C 66/3032 156/272.8 |
| 2014/0349127 A1 | 11/2014 | Minamide et al. | |
| 2016/0279902 A1* | 9/2016 | Yasuda | B32B 27/322 |
| 2017/0040200 A1* | 2/2017 | Bai | H01L 21/6835 |
| 2017/0077333 A1* | 3/2017 | Piel | B32B 15/08 |
| 2020/0386707 A1* | 12/2020 | Funahashi | G01N 27/327 |
| 2021/0189569 A1* | 6/2021 | Asoh | B32B 5/26 |

FOREIGN PATENT DOCUMENTS

| | | | |
|---|---|---|---|
| DE | 102012202748 A1 * | 8/2013 | .......... B32B 27/281 |
| EP | 1 491 328 A1 | 12/2004 | |
| JP | 59-050401 A | 3/1984 | |
| JP | 07-266495 A | 10/1995 | |
| JP | 07-292286 A | 11/1995 | |
| JP | 2006-015609 A | 1/2006 | |
| JP | 2006003196 A * | 1/2006 | |
| JP | 2013-103456 A | 5/2013 | |
| JP | 2015-003990 A | 1/2015 | |
| JP | 06-166140 B2 | 7/2017 | |
| JP | 07-304132 B2 | 7/2023 | |
| KR | 10-2004-0095089 A * | 11/2004 | |

OTHER PUBLICATIONS

Helmenstine, Anne Marie, Ph.D. "Semimetals or Metalloids." ThoughtCo, Aug. 27, 2020, retrieved from thoughtco.com/semimetals-or-metalloids-list-606662. (Year: 2020).*

Wikipedia contributors, "Semimetal," Wikipedia, the free encyclopedia, retrieved on Jul. 29, 2022 from https://en.wikipedia.org/w/index.php?title=Semimetal&oldid=1098580875. (Year: 2022).*

Machine translation of DE102012202748A1, published Aug. 2013. (Year: 2013).*

Machine translation of JP2006003196A, published Jan. 2006. (Year: 2006).*

Machine translation of KR20040095089A, published Nov. 2004, Powered by EPO and Google. (Year: 2004).*

* cited by examiner

COMPOSITE OF THERMALLY-MODIFIED POLYMER LAYER AND INORGANIC SUBSTRATE, COMPOSITE OF POLYMER MEMBER AND INORGANIC SUBSTRATE, AND PRODUCTION METHODS THEREOF

TECHNICAL FIELD

The present invention relates to a composite of thermally-modified polymer layer and inorganic substrate, a composite of polymer member and inorganic substrate, and production methods thereof.

BACKGROUND ART

A polymer member, for example, a member based on a polyolefin such as polypropylene, polyethylene and cycloolefin polymer, is excellent in lightness, mechanical strength, chemical resistance, etc. and therefore, is widely used for molded articles such as resin film, nonwoven fabric, automotive component, electric device component and camera lens. On the other hand, an inorganic material such as metal, semiconductor or an oxide thereof has mechanical, thermal, optical and chemical properties which are different from those of the polymer member.

Accordingly, studies are being made to join a polymer member to an inorganic substrate and favorably utilize those different properties.

In this regard, for example, Patent Literature 1 provides a composite material useful for a protective film of liquid crystal display panel in a television or a microchip etc. by integrating an inorganic material and a polyolefin-based resin material without using an adhesive. Specifically, Patent Literature 1 has proposed a production method for a composite material having an inorganic material and a polyolefin-based resin material, in which a thin film having a thickness of 1 to 50 nm and composed of an organic material having a hydrophilic group is formed on a surface of an inorganic material, and then the inorganic material, on which the thin film was formed, and a polyolefin-based resin material are in each case irradiated with an ultraviolet ray having a wavelength of 100 to 200 nm, and then the polyolefin-based resin material is laminated on the thin film of the inorganic material, and thereby the inorganic material and the polyolefin-based resin material are integrated.

RELATED ART

Patent Literature

[PTL 1] Japanese Unexamined Patent Publication (Kokai) No. 2013-103456

SUMMARY OF THE INVENTION

Problems to be Solved by the Invention

As described above, it is sometimes preferable to join a polymer member to an inorganic substrate without using an adhesive. Accordingly, the present invention provides a method useful for joining a polymer member to an inorganic substrate without using an adhesive, and a composite of thermally-modified polymer layer and inorganic substrate used therefor, etc.

Means to Solve the Problems

The embodiment of the present invention includes the following embodiments.

Embodiment 1

A method for producing a composite of thermally-modified polymer layer and inorganic substrate, including forming a first polymer layer on an inorganic substrate, and heating the first polymer layer so that a first thermally-modified polymer layer is formed and the first thermally-modified polymer layer is bonded onto the inorganic substrate.

Embodiment 2

The method according to embodiment 1, further including forming a second polymer layer on the first thermally-modified polymer layer after the formation of the first thermally-modified polymer layer, and heating the second polymer layer so that a second thermally-modified polymer layer is formed and the second thermally-modified polymer layer is bonded onto the first thermally-modified polymer layer.

Embodiment 3

The method according to embodiment 2, wherein the degree of thermal modification of the second thermally-modified polymer layer is smaller than the degree of thermal modification of the first thermally-modified polymer layer.

Embodiment 4

The method according to embodiment 2, further including forming a third polymer layer on the second thermally-modified polymer layer after the formation of the second thermally-modified polymer layer, and heating the third polymer layer so that a third thermally-modified polymer layer is formed and the third thermally-modified polymer layer is bonded onto the second thermally-modified polymer layer.

Embodiment 5

The method according to embodiment 4, wherein the degree of thermal modification of the second thermally-modified polymer layer is smaller than the degree of thermal modification of the first thermally-modified polymer layer, and the degree of thermal modification of the third thermally-modified polymer layer is smaller than the degree of thermal modification of the second thermally-modified polymer layer.

Embodiment 6

The method according to embodiment 1, wherein the inorganic substrate is selected from the group consisting of metals, semimetals, oxides of metals and semimetals, nitrides of metals and semimetals, carbides of metals and semimetals, carbon materials, and combinations thereof.

Embodiment 7

The method according to embodiment 1, wherein the first polymer layer is formed by coating and/or thermocompression bonding.

Embodiment 8

A method for producing a composite of polymer member and inorganic substrate, including:
producing the composite of thermally-modified polymer layer and inorganic substrate by the method according to embodiment 1, and
joining the polymer member to the first thermally-modified polymer layer so that a polymer member is joined to an inorganic substrate via the first thermally-modified polymer layer.

Embodiment 9

The method according to embodiment 8, wherein the polymer member is in a film shape.

Embodiment 10

The method according to embodiment 8, wherein joining of the polymer member is performed by coating or thermocompression bonding.

Embodiment 11

The method according to embodiment 8, wherein both of the first thermally-modified polymer layer and the polymer member are formed of an olefin polymer.

Embodiment 12

The method according to embodiment 11, wherein the olefin polymer is a cycloolefin polymer.

Embodiment 13

A composite of thermally-modified polymer layer and inorganic substrate, wherein one or a plurality of thermally-modified polymer layers are bonded to an inorganic substrate.

Embodiment 14

The composite according to embodiment 13, wherein the one or plurality of thermally-modified polymer layers contain at least a first thermally-modified polymer layer bonded to the inorganic substrate and a second thermally-modified polymer layer bonded to the first thermally-modified polymer layer.

Embodiment 15

The composite according to embodiment 14, wherein the one or plurality of thermally-modified polymer layers further contain a third thermally-modified polymer layer bonded to the second thermally-modified polymer layer.

Embodiment 16

The composite according to embodiment 13, wherein the inorganic substrate is selected from the group consisting of metals, semimetals, oxides of metals and semimetals, nitrides of metals and semimetals, carbides of metals and semimetals, carbon materials, and combinations thereof.

Embodiment 17

A composite of polymer member and inorganic substrate, wherein a polymer member is bonded to the inorganic substrate via the one or plurality of thermally-modified polymer layers of the composite of thermally-modified polymer layer and inorganic substrate according to embodiment 13.

Embodiment 18

The composite according to embodiment 17, wherein the polymer member is in a film shape.

Embodiment 19

The composite according to embodiment 17, wherein all of the polymer member and the one or plurality of thermally-modified polymer layers are formed of an olefin polymer.

Embodiment 20

The composite according to embodiment 19, wherein the olefin polymer is a cycloolefin polymer.

DESCRIPTION OF EMBODIMENTS

<<Production Method of Composite of Thermally-Modified Polymer Layer and Inorganic Substrate and Production Method of Composite of Polymer Member and Inorganic Substrate>>

The method of the present invention for producing a composite of thermally-modified polymer layer and inorganic substrate includes:
forming a first polymer layer on an inorganic substrate, and heating the first polymer layer so that a first thermally-modified polymer layer is formed and the first thermally-modified polymer layer is bonded onto the inorganic substrate.

The method of the present invention for producing a composite of polymer member and inorganic substrate includes:
producing a composite of thermally-modified polymer layer and inorganic substrate by the method of the present invention for producing a composite of thermally-modified polymer layer and inorganic substrate, and
joining the polymer member to the first thermally-modified polymer layer, the second thermally-modified polymer layer if present, and the third thermally-modified polymer layer if present, so that a polymer membrane is joined to an inorganic substrate via the first thermally-modified polymer layer, the second thermally-modified polymer layer if present, and the third thermally-modified polymer layer if present.

Although not bound by theory, according to the method of the present invention for producing a composite of thermally-modified polymer layer and inorganic substrate, in which a first polymer layer on an inorganic substrate is heated and thermally modified to form a first thermally-modified polymer layer, a bond may be formed between a functional group such as a hydroxyl group on the surface of the inorganic substrate and a polymer constituting the first thermally-modified polymer layer, and, as a result, the adherence of the first thermally-modified polymer layer to the inorganic substrate can be improved.

In addition, although not bound by theory, according to the method of the present invention for producing a composite of polymer member and inorganic substrate, in which a polymer member is joined to a first thermally-modified polymer layer, the polymer member is not joined directly to an inorganic substrate but is joined to the inorganic substrate via the first thermally-modified polymer layer that is a polymer, and, as a result, the adherence of the polymer member to the inorganic substrate can be improved.

<Inorganic Substrate>

The inorganic substrate for use in the method of the present invention may be any inorganic substrate and, for example, may be selected from the group consisting of metals, semimetals, oxides of metals and semimetals, nitrides of metals and semimetals, carbides of metals and semimetals, carbon materials, and combinations thereof. Specifically, the metal includes aluminum, magnesium, titanium, nickel, chromium, iron, copper, gold, silver, tungsten, zirconium, yttrium, indium, iridium, etc., and the semimetal includes silicon, germanium, etc. Accordingly, the metal oxide includes oxides of these metals, etc., and the semimetal oxide includes oxides of these semimetals, etc. The oxide of silicon includes glass such as quartz glass and soda glass. The nitride includes aluminum nitride, silicon nitride, etc. The carbide includes silicon carbide. The carbon material includes diamond, etc.

The surface of the inorganic substrate, particularly a metal or a semimetal, may be subjected to a treatment such as ozone treatment or ultraviolet treatment so as to increase a functional group, for example, a hydroxyl group, capable of being utilized for bonding to the first thermally-modified polymer layer.

From the viewpoint of stably forming a thermally-modified olefin polymer layer on an inorganic substrate, an inorganic material having a melting point higher than the thermal modification temperature of the thermally-modified polymer layer may be preferably used.

The inorganic substrate may be of any shape and, for example, may be of a film shape, a sheet shape, a plate shape (board shape), a tube shape, a rod shape, or a disc shape. In addition, the inorganic substrate may have any size.

(Thermally-Modified Polymer Layer)

In the method of the present invention, a first polymer layer is formed on an inorganic substrate, and the first polymer layer is heated so that a first thermally-modified polymer layer is formed and the first thermally-modified polymer layer is bonded onto the inorganic substrate.

Furthermore, in the method of the present invention, a second polymer layer may be formed on the first thermally-modified polymer layer after the formation of the first thermally-modified polymer layer, and the second polymer layer is heated so that a second thermally-modified polymer layer is formed and the second thermally-modified polymer layer is bonded onto the first thermally-modified polymer layer.

In the case of using a second thermally-modified polymer layer, in order for the first thermally-modified polymer layer to provide good bonding to the inorganic substrate, and in order for the second thermally-modified polymer layer to provide good bonding to the first thermally-modified polymer layer and a polymer member, the degree of thermal modification of the second thermally-modified polymer layer may be smaller than the degree of thermal modification of the first thermally-modified polymer layer.

Furthermore, in the method of the present invention, a third polymer layer may be formed on the second thermally-modified polymer layer after the formation of the second thermally-modified polymer layer, and the third polymer layer is heated so that a third thermally-modified polymer layer is formed and the third thermally-modified polymer layer is bonded onto the second thermally-modified polymer layer.

In the case of using a third thermally-modified polymer layer, in order for the second thermally-modified polymer layer to provide good bonding to the first thermally-modified polymer layer, and in order for the third thermally-modified polymer layer to provide good bonding to the second thermally-modified polymer layer and a polymer member, the degree of thermal modification of the third thermally-modified polymer layer may be smaller than the degree of thermal modification of the second thermally-modified polymer layer.

Furthermore, in the method of the present invention, additional thermally-modified polymer layers such as fourth and fifth thermally-modified polymer layers may be used in the same manner.

The degree of thermal modification of these thermally-modified polymer layers can be adjusted according to the temperature, time, ambient atmosphere, etc. of the heat treatment for thermal modification.

Specifically, for example, the degree of thermal modification of the first thermally-modified polymer layer may be such a degree as that the first thermally-modified polymer layer is bonded onto the inorganic substrate, that is, such a degree as that the adherence of the first thermally-modified polymer layer to the inorganic substrate becomes larger compared with the adherence of the first thermally-unmodified polymer layer to the inorganic substrate.

Similarly, the degree of thermal modification of the second thermally-modified polymer layer may be such a degree as that the second thermally-modified polymer layer is bonded onto the first thermally-modified polymer layer, that is, such a degree as that the adherence of the second thermally-modified polymer layer to the first thermally-modified polymer layer becomes larger compared with the adherence of the second thermally-unmodified polymer layer to the first thermally-modified polymer layer.

In addition, similarly, the degree of thermal modification of the third thermally-modified polymer layer may be such a degree as that the third thermally-modified polymer layer is bonded onto the second thermally-modified polymer layer, that is, such a degree as that the adherence of the third thermally-modified polymer layer to the second thermally-modified polymer becomes larger compared with the adherence of the third thermally-unmodified polymer layer to the second thermally-modified polymer layer.

The degree of thermal modification of these thermally-modified polymer layers can be adjusted, for example, by the temperature of the heat treatment for thermal modification of the thermally-modified polymer layer, or by the oxygen concentration in the atmosphere where heating is performed. More specifically, the degree of thermal modification can be increased by raising the heating temperature and/or increasing the oxygen concentration in the atmosphere where heating is performed, and conversely, the degree of thermal modification can be reduced by lowering the heating temperature and/or decreasing the oxygen concentration in the atmosphere where heating is performed.

The temperature of the heat treatment for the thermal modification of the thermally-modified polymer layer may be 50° C. or more, 100° C. or more, 140° C. or more, 160° C. or more, 180° C. or more, or 200° C. or more, and may be 500° C. or less, 400° C. or less, 360° C. or less, 320° C. or less, or 280° C. or less. The heating can be performed in an oxygen-containing atmosphere, particularly, in air.

The degree of thermal modification of these thermally-modified polymer layers can be evaluated using, for example, the oxygen content in the thermally-modified polymer constituting the thermally-modified polymer layer, specifically, the ratio of the number of oxygen atoms contained in the thermally-modified polymer layer to the total of the number of oxygen atoms and carbon atoms contained in the thermally-modified polymer layer (number of oxygen atoms/(number of oxygen atoms+number of carbon atoms)×100(%)). In this case, it is considered that as the ratio is larger, the degree of thermal modification is larger. Here, the means for evaluating the content of oxygen and carbon atoms in the thermally-modified polymer layer includes, for example, X-ray photoelectron spectroscopy (XPS), and as the XPS apparatus therefor, K-Alpha (Thermo Fisher Scientific K.K.) can be used.

In particular, when the ratio (number of oxygen atoms/(number of oxygen atoms+number of carbon atoms)×100 (%)) is 0.3% or more, 0.5% or more, 1.0% or more, 2.0% or more, or 5.0% or more and is 50% or less, 30% or less, 20% or less, 10% or less, or 8% or less, it is appropriate to use the ratio as an indicator indicating the degree of thermal modification of the thermally-modified polymer layer.

In the case of evaluating the degree of thermal modification by using the ratio above (number of oxygen atoms/(number of oxygen atoms+number of carbon atoms)×100 (%)), the difference in the ratio between adjacent thermally-modified polymer layers, such as a difference between the ratio of the first thermally-modified polymer layer and the ratio of the second thermally-modified polymer layer, may be 0.1% or more, 0.2% or more, 0.3% or more, 0.4% or more, 0.5% or more, 0.8% or more, 1.0% or more, 2.0% or more, or 3.0% or more, and may be 10.0% or less, 7.0% or less, 5.0% or less, 3.0% or less, 2.0% or less, 1.0% or less, 0.5% or less, 0.3% or less, or 0.1% or less.

More specifically, for example, the ratio of the number of oxygen atoms contained in the second thermally-modified polymer layer to the total of the numbers of oxygen atoms and carbon atoms contained in the second thermally-modified polymer layer (i.e., number of oxygen atoms/(number of oxygen atoms+number of carbon atoms)×100(%) with respect to the second thermally-modified polymer layer) may be smaller by 0.1% or more and by 10.0% or less than the ratio of the number of oxygen atoms contained in the first thermally-modified polymer layer to the total of the numbers of oxygen atoms and carbon atoms contained in the first thermally-modified polymer layer (i.e., number of oxygen atoms/(number of oxygen atoms+number of carbon atoms)×100(%) with respect to the first thermally-modified polymer layer).

In addition, the degree of thermal modification of these thermally-modified polymer layers can be evaluated, for example, by the IR absorption spectrum of the thermally-modified polymer constituting the thermally-modified polymer layer, and as the IR absorption analyzer therefor, Nicolet 6700 (Thermo Fisher SCIENTIFIC K.K.) can be used. Specifically, the degree of thermal modification of the thermally-modified polymer layer can be evaluated by the ratio of the intensity of absorption peak of C=O stretching vibration to the intensity of absorption peak of C—H stretching vibration (intensity of absorption peak of C=O stretching vibration/intensity of absorption peak of C—H stretching vibration (-)). In this case, it is considered that as the ratio is larger, the degree of thermal modification is larger. The intensity of absorption peak can be determined by reading the maximum value of the absorbance at the absorption peak.

In particular, when the ratio (intensity of absorption peak of C=O stretching vibration/intensity of absorption peak of C—H stretching vibration (-)) is 0.01 or more, 0.02 or more, 0.05 or more, 0.1 or more, 0.15 or more, or 0.20 or more, and is 20 or less, 10 or less, or 5 or less, it is appropriate to use the ratio as an indicator indicating the degree of thermal modification of the thermally-modified polymer layer.

In the case of evaluating the degree of thermal modification by using the ratio above (intensity of absorption peak of C=O stretching vibration/intensity of absorption peak of C—H stretching vibration (-)), the difference in the ratio between adjacent thermally-modified polymer layers, such as a difference between the ratio of the first thermally-modified polymer layer and the ratio of the second thermally-modified polymer layer, may be 0.1 or more, 0.2 or more, 0.3 or more, 0.4 or more, 0.5 or more, 0.8 or more, 1.0 or more, 2.0 or more, or 3.0 or more, and may be 10.0 or less, 7.0 or less, 5.0 or less, 3.0 or less, 2.0 or less, 1.0 or less, 0.5 or less, 0.3 or less, or 0.1 or less.

More specifically, for example, the ratio of the intensity of absorption peak of C=O stretching vibration in the second thermally-modified polymer layer to the intensity of absorption peak of C—H stretching vibration in the second thermally-modified polymer layer (i.e., intensity of absorption peak of C=O stretching vibration/intensity of absorption peak of C—H stretching vibration (-) with respect to the second thermally-modified polymer layer) may be smaller by 0.1 or more and by 20.0 or less than the ratio of the intensity of absorption peak of C=O stretching vibration in the first thermally-modified polymer layer to the intensity of absorption peak of C—H stretching vibration in the first thermally-modified polymer layer (i.e., intensity of absorption peak of C=O stretching vibration/intensity of absorption peak of C—H stretching vibration (-) with respect to the first thermally-modified polymer layer).

The heating method is not particularly limited, but, a method using a heating source such as oven, hot plate, infrared ray, flame, laser or flash lamp may be used.

Incidentally, the polymer layer such as first polymer layer can be formed by coating and/or thermocompression bonding.

In the case of forming the polymer layer by coating, the polymer layer can be formed by dissolving a polymer constituting the polymer layer in a solvent to prepare a solution, performing a coating with the solution, and drying. In this case, the coating method includes a technique using a solution, such as spin coating method, roll coater method, spray coating method, die coater method, applicator method, dip coating method, brush coating, spatula coating, roller coating and curtain flow coater method.

In the case of forming the polymer layer such as first polymer layer by a technique using a solution, the method may include a step of removing the solvent by heating after the application of the coating solution. In this case, as for the heating conditions, conditions of a temperature, a heating time and an ambient pressure which are suitable to remove the solvent from the coating film may be selected.

In the case of forming the coating layer by thermocompression bonding, this can be performed by a method of melting or welding a bulk solid, a powder, a film, etc. while optionally pressing with the application of a pressure, for example, a method such as hot pressing method, welding method and powder coating method.

Incidentally, the thickness of the polymer layer such as first polymer layer may be any thickness enabling the obtained thermally-modified polymer layer to provide good joining between the inorganic substrate and the polymer member, and the thickness may be, for example, 1 nm or more, 5 nm or more, or 10 nm or more, and may be 100 μm or less, 30 μm or less, or 10 μm or less, and furthermore, 1,000 nm or less, 500 nm or less, or 100 nm or less.

As described above, the thermally-modified polymer layer is a layer via which a polymer member is joined to an inorganic substrate. Accordingly, the thermally-modified polymer layer is preferably composed of the same polymer as the polymer constituting the polymer member so as to promote joining between the thermally-modified polymer layer and the polymer member.

For this reason, for example, both of the polymer layer such as first polymer layer and the polymer member may be formed of an olefin polymer such as a cycloolefin polymer.

Incidentally, the olefin polymer means a polymer obtained by polymerizing a monomer containing an olefin as the main component, that is, a polymer obtained by polymerizing a monomer containing an olefin-derived monomer moiety in an amount of 50 mass % or more, 60 mass % or more, 70 mass % or more, 80 mass % or more, 90 mass % or more, or 95 mass % or more. The olefin polymer includes, for example, polyethylene, polypropylene, polybutene, polymethylpentene, a copolymer of α-olefin and ethylene or propylene, such as propylene-ethylene copolymer and propylene-butene copolymer, a styrene-butadiene-styrene block copolymer, a styrene-hexadiene-styrene copolymer, a styrene-pentadiene-styrene copolymer, an ethylene-propylene-diene copolymer (RPDM), and a cycloolefin resin, but the present invention is not limited only to these examples. One of these olefin polymers may be used alone, or two or more kinds thereof may be used in combination.

Among these olefin polymers, particularly, a cycloolefin polymer may be used.

The cycloolefin polymer is a polymer having a cycloolefin moiety in the polymer main chain. The cycloolefin polymer includes, for example, a ring-opened polymer of a cycloolefin monomer, an addition polymer of a cycloolefin monomer, and a copolymer of a cycloolefin monomer and a chain olefin, but the present invention is not limited only to these examples.

The cycloolefin monomer has a ring structure formed of carbon atoms and is a compound having a carbon-carbon double bond in the ring structure. Examples of the cycloolefin monomer include a norbornene-based monomer that is a monomer containing a norbornene ring, for example, a bicyclic form such as 2-norbornene and norbornadiene, a tricyclic form such as dicyclopentadiene and dihydrodicyclopentadiene, a tetracyclic form such as tetracyclododecene, ethylidenetetracyclododecene and phenyltetracyclododecene, a pentacyclic form such as tricyclopentadiene, and a heptacyclic form such as tetracyclopentadiene; and a monocyclic cycloolefin such as cyclobutene, cyclopentene, cyclooctene, cyclododecene and 1,5-cyclooctadiene, but the present invention is not limited only to these examples. The cycloolefin monomer may have a substituent as long as the object of the present invention is not inhibited.

The cycloolefin polymer can be easily commercially available as, for example, trade names: Zeonex series, Zeonor series, etc. produced by Zeon Corporation, trade name: Sumilite series produced by Sumitomo Bakelite Co., Ltd., trade name: Arton series produced by JSR Corporation, trade name: Apel series produced by Mitsui Chemicals Inc., trade name: Topas produced by Ticona, trade name: Optorez series produced by Hitachi Chemical Company, Ltd.

<Polymer Member>

In the method of the present invention, the polymer member may be a member having any shape and, for example, may be of a film shape. In this case, the polymer member can be joined by coating or thermocompression bonding.

As described above, the polymer layer such as first polymer layer and the polymer member are preferably the same polymer and, for example, both of the polymer layer such as first polymer layer and the polymer member may be formed of an olefin polymer, for example, a cycloolefin polymer. With respect to the specific material and formation method for the polymer member, the description above regarding the polymer layer such as first polymer layer may be referred to.

<<Composite of Thermally-Modified Polymer Layer and Inorganic Substrate, and Composite of Polymer Member and Inorganic Substrate>>

In the composite of thermally-modified polymer layer and inorganic substrate of the present invention, one or a plurality of thermally-modified polymer layers are bonded to an inorganic substrate. In addition, in the composite of polymer member and inorganic substrate of the present invention, a polymer member is bonded to an inorganic substrate via one or a plurality of thermally-modified polymer layers of the composite of thermally-modified polymer layer and inorganic substrate of the present invention.

Figure 1A:
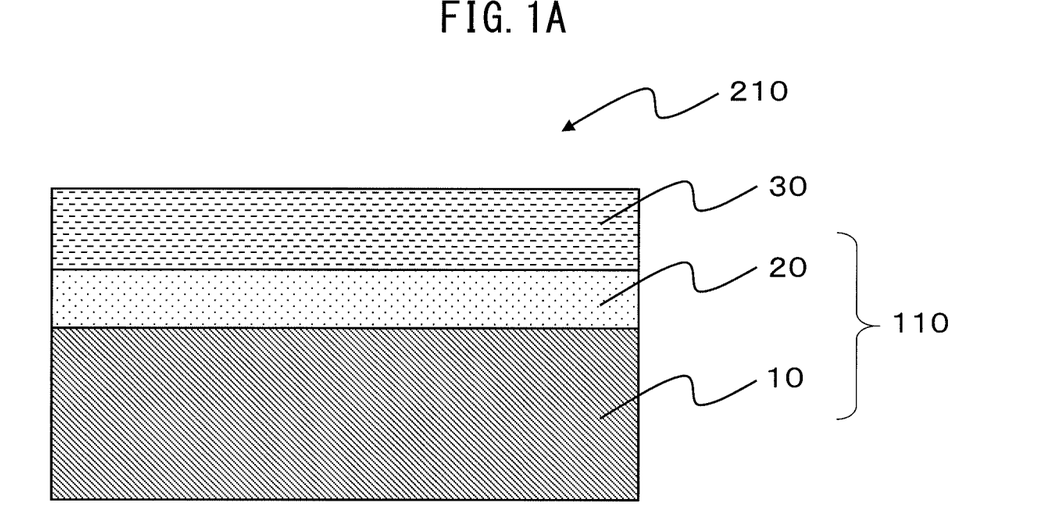
FIG. 1A is a schematic cross-sectional diagram of the composite of polymer member and inorganic substrate of the present invention having the composite of thermally-modified polymer layer and inorganic substrate of the present invention.
Figure 1B:
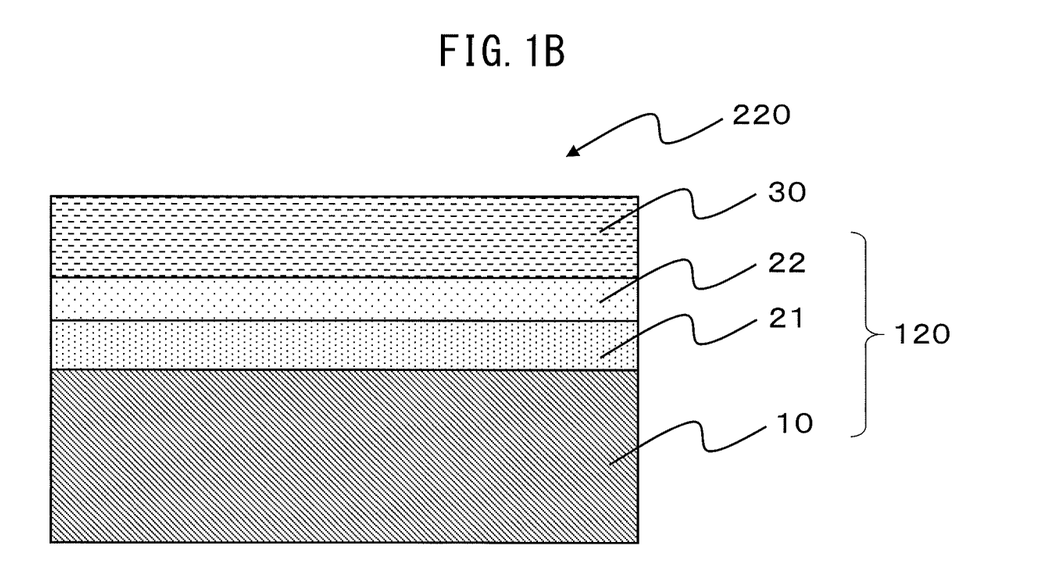
FIG. 1B is a schematic cross-sectional diagram of the composite of polymer member and inorganic substrate of the present invention having the composite of thermally-modified polymer layers and inorganic substrate of the present invention.

Specifically, as illustrated in FIG. 1A and FIG. 1B, in the composite of polymer member and inorganic substrate 210 or 220 of the present invention, a polymer member 30 is joined to an inorganic substrate 10 via one or a plurality of thermally-modified polymer layers 20, 21 and 22 of the composite of thermally-modified polymer layer and inorganic substrate 110 or 120 of the present invention.

According to this composite of polymer member and inorganic substrate of the present invention, the adherence of the polymer member to the inorganic substrate can be improved.

For details of each configuration of the composite of thermally-modified polymer layer and inorganic substrate of the present invention, and the composite of polymer member and inorganic substrate of the present invention, the description regarding the methods of the present invention may be referred to.

EXAMPLES

The polymers used in the following Examples to form a thermally-modified polymer layer and a polymer member film are as follows:

COP1: cycloolefin polymer (Arton (trademark) (JSR Corporation))

COP2: cycloolefin polymer (Zeon Corporation, Zeonex (trademark) 480R, glass transition temperature: 138° C.)

Examples 1 to 14 and Comparative Examples 1 and 2

As described below, in Examples 1 to 14, COP1 was used as the material for both the thermally-modified polymer layer and the polymer member film. In Comparative Examples 1 and 2, a thermally-modified polymer layer was not used, and COP1 was used as the material of the polymer member film.

Example 1

(Preparation of Solution for Thermally-Modified Polymer Layer)

A solution for thermally-modified polymer layer was obtained by mixing and stirring 7 mass % of COP1 and 93 mass % of chloroform at room temperature.

(Formation of First Thermally-Modified Polymer Layer)

The solution for thermally-modified polymer layer was applied by spin coating onto a silicon substrate serving as an inorganic substrate. In the spin coating, a rotation speed of 2,000 rpm was maintained for 20 seconds.

Thereafter, the silicon substrate thus-coated with the solution for thermally-modified polymer layer was held on a hot plate heated at 120° C., and the solution for thermally-modified polymer layer was thereby dried to obtain a silicon substrate to which a first polymer layer is joined. This substrate was then held on a hot plate heated at 280° C. for 1 minute to thermally modify the first polymer layer, and a silicon substrate with a first thermally-modified polymer layer having a film thickness of 23 nm, was thereby obtained.

(Formation of Second Thermally-Modified Polymer Layer)

The solution for thermally-modified polymer layer was applied by spin coating onto the first thermally-modified polymer layer of the silicon substrate obtained above. In the spin coating, a rotation speed of 2,000 rpm was maintained for 20 seconds.

Thereafter, the silicon substrate thus-coated with the solution for thermally-modified polymer layer was held on a hot plate heated at 120° C., and the solution for thermally-modified polymer layer was thereby dried to form a second polymer layer on the first thermally-modified polymer layer. This substrate was then held on a hot plate heated at 200° C. for 2 minutes to thermally modify the second polymer layer, and a second thermally-modified polymer layer having a film thickness of 23 nm was thereby bonded onto the first thermally-modified polymer layer. The thus-obtained composite of thermally-modified polymer layer and inorganic substrate was designated as the composite of thermally-modified polymer layer and inorganic substrate of Example 1.

(Preparation of Solution for Polymer Member)

A solution for polymer member was obtained by mixing and stirring 7 mass % of COP1 and 93 mass % of chloroform at room temperature.

(Joining of Polymer Member)

The solution for polymer member was applied by spin coating onto the second thermally-modified polymer layer obtained above. In the spin coating, a rotation speed of 2,000 rpm was maintained for 20 seconds.

Thereafter, the silicon substrate thus-coated with the solution for polymer member was held on a hot plate heated at 140° C. for 10 minutes, and the solution for thermally-modified polymer layer was thereby dried to join a polymer member film having a thickness or 23 nm onto the second thermally-modified polymer layer. The thus-obtained composite of polymer member and inorganic substrate was designated as the composite of polymer member and inorganic substrate of Example 1.

(Cross-Cut Test)

In a laminate of the first and second thermally-modified polymer layers formed on the silicon substrate and the polymer member film, cuts reaching the silicon substrate were introduced at intervals of 1 mm by using a cutter knife. After introducing 6 cuts, another 6 cuts were introduced to run at right angles to the aforementioned cuts, thereby forming checkerboard cuts.

Thereafter, a Scotch mending tape (3M Company, 810, width: 24 mm) was stuck to the surface of the polymer member film and bonded by rubbing the tape with a finger and then, the tape was peeled off. The region in which sticking and peeling of the tape were performed was observed by a stereomicroscope.

The evaluation results were classified as follows.
A: The edge of a cut was completely smooth and separation was observed in none of squares of the grid.
B: Partial separation of the polymer member film occurred, but the affected area in the crosscut part was less than 35%.
C: Significant separation occurred throughout the polymer membrane film, and the affected area in the cross-cut part was 35% or more.

In the composite of polymer member and inorganic substrate of Example 1, the edge of a cut was completely smooth, and separation was observed in none of squares of the grid (evaluation A). Preparation conditions and evaluation results of this composite material are shown in Table 1 below.

Examples 2 to 8

The composite of polymer member and inorganic substrate of Examples 2 to 8 were prepared in the same manner as in Example 1 except that the polymer concentration in the solution for forming the thermally-modified polymer layer (Examples 2 and 3), the spin coating conditions in the solution for forming the thermally-modified polymer layer (Example 4), and the thermal modification temperature of the first thermally-modified polymer (Examples 5 to 8) were changed as shown in Tables 1 and 2. The obtained composites were evaluated in the same manner as in Example 1. Preparation conditions and evaluation results of these composite materials are shown in Tables 1 and 2 below.

Example 3A (Formation of First and Second Thermally-Modified Polymer Layers)

A first thermally-modified polymer layer and a second thermally-modified polymer layer were formed on a silicon substrate in the same manner as in Example 1 except that the thermal modification temperature of the first thermally-modified polymer was changed to 300° C. and the thermal modification temperature of the second thermally-modified polymer was changed to 280° C.

(Formation of Third Thermally-Modified Polymer Layer)

The solution for thermally-modified polymer layer was applied by spin coating onto the second thermally-modified polymer layer obtained above. In the spin coating, a rotation speed of 2,000 rpm was maintained for 20 seconds.

Thereafter, the silicon substrate thus-coated with the solution for thermally-modified polymer layer was held on a hot plate heated at 120° C., and the solution for thermally-modified polymer layer was thereby dried to form a third polymer layer on the second thermally-modified polymer layer. This substrate was then held on a hot plate heated at 200° C. for 2 minutes to thermally modify the third polymer layer, and a third thermally-modified polymer layer having a film thickness of 23 nm was thereby bonded onto the second thermally-modified polymer layer. The thus-obtained composite of thermally-modified polymer layer and inorganic substrate was designated as the composite of thermally-modified polymer layer and inorganic substrate of Example 3A.

(Joining of Polymer Member)

Thereafter, joining of a polymer member was performed in the same manner as in Example 1 to prepare the composite of polymer member and inorganic substrate of Example 3A.

(Cross-Cut Test)

The composite of polymer member and inorganic substrate of Example 3A was evaluated in the same manner as in Example 1.

Preparation conditions and evaluation results of this composite material are shown in Table 1 below.

Comparative Example 1

The composite of polymer member and inorganic substrate of Comparative Example 1 was prepared in the same manner as in Example 1 except that first and second thermally-modified polymer layers were not formed on a silicon substrate serving as the inorganic substrate and COP1 was applied by spin coating directly onto the silicon substrate. The obtained composite was evaluated in the same manner as in Example 1. Preparation conditions and evaluation results of this composite material are shown in Tables 1 and 2 below.

Example 9

The composite of polymer member and inorganic substrate of Example 9 was prepared in the same manner as in Example 1 except that a film (thickness: 100 μm) of COP1 was arranged on the second thermally-modified polymer layer in place of applying a cycloolefin polymer by spin coating at the time of joining of a polymer member and held at a pressure of 50 MPa and a temperature of 140° C. for 2 hours and the film and the second thermally-modified polymer layer were thereby thermocompression-bonded. The obtained composite was evaluated in the same manner as in Example 1. Preparation conditions and evaluation results of this composite material are shown in Table 3 below.

Comparative Example 2

The composite of polymer member and inorganic substrate of Comparative Example 2 was prepared in the same manner as in Example 9 except that first and second thermally-modified polymer layers were not formed on a silicon substrate serving as the inorganic substrate and a COP1 film (thickness: 100 μm) was thermocompression-bonded directly onto the silicon substrate. The obtained composite was evaluated in the same manner as in Example 1. Preparation conditions and evaluation results of this composite material are shown in Table 3 below.

Examples 10 to 14

The composite of polymer member and inorganic substrate of Examples 10 to 14 were prepared in the same manner as in Examples 5, 6, 1, 7 and 8, respectively, except that after a first thermally-modified polymer layer was formed on a silicon substrate serving as the inorganic substrate, the solution for polymer member was applied by spin coating directly onto the first thermally-modified polymer layer without forming a second thermally-modified polymer layer. The obtained composites were evaluated in the same manner as in Example 1. Preparation conditions and evaluation results of these composite materials are shown in Table 4 below.

Examples 15 to 20 and Comparative Example 3

As described below, in Examples 15 to 20, COP2 was used as the material for both the thermally-modified polymer layer and the polymer member film. In Comparative Example 3, a thermally-modified polymer layer was not used, and COP2 was used as the material of the polymer member film.

Example 15

The composite of polymer member and inorganic substrate of Example 15 was prepared in the same manner as in Example 1 except that in the preparation of both a solution for thermally-modified polymer layer and a solution for polymer member, the solution for thermally-modified polymer layer was obtained by mixing and stirring 10 mass % of COP2 and 90 mass % of toluene at room temperature. The obtained composite was evaluated in the same manner as in Example 1. Preparation conditions and evaluation results of this composite material are shown in Table 5 below.

Example 16

The composite of polymer member and inorganic substrate of Example 16 was prepared in the same manner as in Example 15 except that the polymer concentration in the solution for forming the thermally-modified polymer was changed from 10 mass % to 1 mass %. The obtained composite was evaluated in the same manner as in Example 1. Preparation conditions and evaluation results of this composite material are shown in Table 5 below.

Comparative Example 3

The composite of polymer member-inorganic substrate of Comparative Example 3 was prepared in the same manner as in Example 15 except that COP2 was applied by spin coating directly onto the silicon substrate without forming first and second thermally-modified polymer layers on a silicon substrate serving as the inorganic substrate. The obtained composite was evaluated in the same manner as in Example 1. Preparation conditions and evaluation results of this composite material are shown in Table 5 below.

Examples 17 to 20

The composite of polymer member and inorganic substrate of Examples 17 to 20 were prepared in the same manner as in Example 15 except that the temperature of thermal modification of the first thermally-modified polymer was changed as shown in Table 6. The obtained composites were evaluated in the same manner as in Example 1. Preparation conditions and evaluation results of these composite materials are shown in Table 6 below.

Example 21 and Comparative Example 4

As described below, in Example 21, a polyethylene film (thickness: 30 μm) was used as the material for both the thermally-modified polymer layer and the polymer member film. In Comparative Example 4, a thermally-modified polymer layer was not used, and a polyethylene film (thickness: 30 μm) was used as the material of the polymer member film.

Example 21

(Formation of First Thermally-Modified Polymer Layer)

In the state of a polyethylene film (PE film) (thickness: 30 μm) being arranged on a silicon substrate serving as the inorganic substrate, the substrate was heated at 120° C. and held for 1 minute to obtain a silicon substrate with a polyethylene film. This substrate was then held on a hot plate heated at 280° C. for 1 minute to thermally modify the polyethylene film, and a silicon substrate with a first thermally-modified polymer layer was thereby obtained.
(Formation of Second Thermally-Modified Polymer Layer)

In the state of a polyethylene film (thickness: 30 μm) being arranged on the first thermally-modified polymer layer of the silicone substrate obtained above, the substrate was heated at 120° C. and held for 1 minute to allow attaching of the polyethylene film onto the first thermally-modified polymer layer. This substrate was then held on a hot plate heated at 200° C. for 2 minutes to thermally modify the polyethylene film, and a second thermally-modified polymer layer was thereby bonded onto the first thermally-modified polymer layer. The thus-obtained composite of thermally-modified polymer layer and inorganic substrate was designated as the composite of thermally-modified polymer layer and inorganic substrate composite of Example 21.
(Joining of Polymer Member)

In the state of a polyethylene film (thickness: 30 μm) being arranged on the second thermally-modified polymer layer obtained above, the substrate was heated at 120° C. and held for 1 minute and thereafter, the substrate was further heated at 140° C. and held for 10 minutes to allow joining of the polyethylene film as the polymer member onto the first thermally-modified polymer layer. The thus-obtained polymer member-inorganic substrate composite was designated as the polymer member-inorganic substrate composite of Example 21 and evaluated in the same manner as in Example 1. Preparation conditions and evaluation results of this composite material are shown in Table 7 below.

Comparative Example 4

The composite of polymer member and inorganic substrate of Comparative Example 4 was prepared in the same manner as in Example 21 except that a polyethylene film serving as the polymer member was directly joined onto the silicon substrate without forming first and second thermally-modified polymer layers on a silicon substrate serving as the inorganic substrate. The obtained composite was evaluated in the same manner as in Example 1. Preparation conditions and evaluation results of this composite material are shown in Table 7 below.

Examples 22 to 27

As described below, in Examples 22 to 27, different polymers were used for the material of thermally-modified polymer layer and the material of polymer member film.

Examples 22 and 23

(Formation of First and Second Thermally-Modified Polymer Layers)

As in Example 1, first and second thermally-modified polymer layers were formed using COP1 on a silicon substrate serving as the inorganic substrate.
(Joining of Polymer Member)

In Example 22, the solution for COP2 polymer member obtained as in Example 15 was applied by spin coating onto the second thermally-modified polymer layer obtained above and dried to prepare the composite of polymer member and inorganic substrate of Example 22, and the obtained composite was evaluated in the same manner as in Example 1. Preparation conditions and evaluation results of this composite material are shown in Table 8 below.

In Example 23, a polyethylene film (thickness: 30 μm) was joined as in Example 21 onto the second thermally-modified polymer layer obtained above to prepare the composite of polymer member and inorganic substrate of Example 23, and the obtained composite was evaluated in the same manner as in Example 1. Preparation conditions and evaluation results of this composite material are shown in Table 8 below.

Examples 24 and 25

(Formation of First and Second Thermally-Modified Polymer Layers)

As in Example 15, first and second thermally-modified polymer layers were formed using COP2 on a silicon substrate serving as the inorganic substrate.
(Joining of Polymer Member)

In Example 24, the solution for COP1 polymer member obtained as in Example 1 was applied by spin coating onto the second thermally-modified polymer layer obtained above and dried to prepare the composite of polymer member and inorganic substrate of Example 24, and the obtained composite was evaluated in the same manner as in Example 1. Preparation conditions and evaluation results of this composite material are shown in Table 8 below.

In Example 25, a polyethylene film (thickness: 30 μm) was joined as in Example 21 onto the second thermally-modified polymer layer obtained above to prepare the composite of polymer member and inorganic substrate of Example 25, and the obtained composite was evaluated in the same manner as in Example 1. Preparation conditions and evaluation results of this composite material are shown in Table 8 below.

Examples 26 and 27

(Formation of First and Second Thermally-Modified Polymer Layers)

As in Example 21, first and second thermally-modified polymer layers were formed using a polyethylene film (thickness: 30 μm) on a silicon substrate serving as the inorganic substrate.

(Joining of Polymer Member)

In Example 26, the solution for COP1 polymer member obtained as in Example 1 was applied by spin coating onto the second thermally-modified polymer layer obtained above and dried to prepare the composite of polymer member and inorganic substrate of Example 26, and the obtained composite was evaluated in the same manner as in Example 1. Preparation conditions and evaluation results of this composite material are shown in Table 8 below.

In Example 27, the solution for COP2 polymer member obtained as in Example 15 was applied by spin coating onto the second thermally-modified polymer layer obtained above and dried to prepare the composite of polymer member and inorganic substrate of Example 26, and the obtained composite was evaluated in the same manner as in Example 1. Preparation conditions and evaluation results of this composite material are shown in Table 8 below.

Examples 28 to 30 and Comparative Examples 5 to 7

Examples 28 to 30

The composite of polymer member and inorganic substrate of Examples 28 to 30 were prepared in the same manner as in Example 15 except that a silicon substrate having a SiN layer on the surface (Example 28), a copper sheet (Example 29), and an aluminum sheet (Example 30) were used respectively as the inorganic substrate in place of the silicon layer. The obtained composites were evaluated in the same manner as in Example 1. Preparation conditions and evaluation results of these composite materials are shown in Table 9 below.

Comparative Examples 5 to 7

The composite of polymer member and inorganic substrate of Comparative Examples 5 to 7 were prepared in the same manner as in Examples 28 to 30, respectively, except that the thermally-modified polymer layer was not used. The obtained composites were evaluated in the same manner as in Example 1. Preparation conditions and evaluation results of these composite materials are shown in the Table below.

Comparative Examples 8 to 13

As described below, in Comparative Examples 8 to 13, a silicon substrate serving as the inorganic substrate was treated with a silane coupling agent, and a polymer member was joined to the treated surface.

Comparative Examples 8 and 9

A silicon substrate serving as the inorganic substrate was subjected to an ultraviolet and ozone treatment (UV/O3 treatment) and then held for 3 hours in a saturated vapor pressure atmosphere at 150° C. containing octadecyltriethoxysilane (OTS) as a silane coupling agent to obtain an OTS-treated silicon substrate.

In Comparative Example 8, the composite of polymer member and inorganic substrate of Comparative Example 8 was prepared by joining a polymer member on a surface of the OTS-treated silicon substrate obtained above by spin coating in the same manner as in Example 15 without forming a thermally-modified polymer layer on the surface of the OTS-treated silicon substrate. The evaluation was performed in the same manner as in Example 1. Preparation conditions and evaluation results of this composite material are shown in Table 10 below.

In Comparative Example 9, the composite of polymer member and inorganic substrate of Comparative Example 9 was prepared by joining a polymer member on a surface of the OTS-treated silicon substrate obtained above by thermocompression bonding in the same manner as in Example 21 without forming a thermally-modified polymer layer on the surface of the OTS-treated silicon substrate. The evaluation was performed in the same manner as in Example 1. Preparation conditions and evaluation results of this composite material are shown in Table 10 below.

Comparative Examples 10 and 11

The composite of polymer member and inorganic substrate composites of Comparative Examples 10 and 11 were prepared in the same manner as in Comparative Examples 8 and 9, respectively, except that 3-phenylpropyltriethoxysilane (PTS) was used as the silane coupling agent in place of octadecyltriethoxysilane (OTS). The obtained composites were evaluated in the same manner as in Example 1. Preparation conditions and evaluation results of these composite materials are shown in Table 10 below.

Comparative Examples 12 and 13

The composite of polymer member and inorganic substrate of Comparative Examples 12 and 13 were prepared in the same manner as in Comparative Examples 8 and 9, respectively, except that as the silane coupling agent, 3-aminopropyltriethoxysilane (ATS) was used in place of octadecyltriethoxysilane (OTS). The obtained composites were evaluated in the same manner as in Example 1. Preparation conditions and evaluation results of these composite materials are shown in Table 10 below.

TABLE 1

| | Inorganic Substrate | Raw Material Solvent | Raw Material Polymer | Polymer Concentration (mass %) | First Thermally-Modified Polymer Layer Temperature (° C.) | First Thermally-Modified Polymer Layer Time (min) | Second Thermally-Modified Polymer Layer Temperature (° C.) | Second Thermally-Modified Polymer Layer Time (min) | Third Thermally-Modified Polymer Layer Temperature (° C.) | Third Thermally-Modified Polymer Layer Time (min) | Polymer Member Raw Material | Polymer Member Joining Method | Cross-Cut Test Results |
|---|---|---|---|---|---|---|---|---|---|---|---|---|---|
| Example 1 | Si | chloroform | COP1*[1] | 7 | 280 | 1 | 200 | 2 | | | COP1 | spin coating | A |
| Example 2 | Si | chloroform | COP1 | 3 | 280 | 1 | 200 | 2 | | | COP1 | spin coating | A |
| Example 3 | Si | chloroform | COP1 | 1 | 280 | 1 | 200 | 2 | | | COP1 | spin coating | A |
| Example 3A | Si | chloroform | COP1 | 1 | 300 | 1 | 280 | 1 | 200 | 2 | COP1 | spin coating | A |
| Example 4*[2] | Si | chloroform | COP1 | 1 | 280 | 1 | 200 | 2 | | | COP1 | spin coating | A |
| Comparative Example 1 | Si | | | | | | | | | | COP1 | spin coating | C |

*[1]COP1 is a cycloolefin polymer (JSR Corporation, Arton (trademark))

*[2]Example 4 is the same as Example 3 except that the rotation speed of spin coating at the formation of the thermally-modified polymer layer was changed from 2,000 rpm to 6,000 rpm.

TABLE 2

| | Inorganic Substrate | Raw Material Solvent | Raw Material Polymer | Polymer Concentration (mass %) | First Thermally-Modified Polymer Layer Temperature (° C.) | First Thermally-Modified Polymer Layer Time (min) | Second Thermally-Modified Polymer Layer Temperature (° C.) | Second Thermally-Modified Polymer Layer Time (min) | Polymer Member Raw Material | Polymer Member Joining Method | Cross-Cut Test Results |
|---|---|---|---|---|---|---|---|---|---|---|---|
| Example 5 | Si | chloroform | COP1*[1] | 7 | 360 | 1 | 200 | 2 | COP1 | spin coating | B |
| Example 6 | Si | chloroform | COP1 | 7 | 320 | 1 | 200 | 2 | COP1 | spin coating | B |
| Example 1 | Si | chloroform | COP1 | 7 | 280 | 1 | 200 | 2 | COP1 | spin coating | A |
| Example 7 | Si | chloroform | COP1 | 7 | 240 | 1 | 200 | 2 | COP1 | spin coating | B |
| Example 8 | Si | chloroform | COP1 | 7 | 200 | 1 | 200 | 2 | COP1 | spin coating | B |
| Comparative Example 1 | Si | | | | | | | | COP1 | spin coating | C |

*[1]COP1 is a cycloolefin polymer (JSR Corporation, Arton (trademark))

TABLE 3

| | Thermally-Modified Polymer Layer | | | | | | | | | |
|---|---|---|---|---|---|---|---|---|---|---|
| | | Raw Material | | | Forming Conditions | | | | Polymer Member | Cross-Cut Test Results |
| | | | | | First Thermally-Modified Polymer Layer | | Second Thermally-Modified Polymer Layer | | | |
| | Inorganic Substrate | Solvent | Polymer | Concentration (mass %) | Temperature (° C.) | Time (min) | Temperature (° C.) | Time (min) | Raw Material | Joining Method | |
| Example 9 | Si | chloroform | COP1*[1] | 7 | 280 | 1 | 200 | 2 | COP1 film | thermocompression bonding | A |
| Comparative Example 2 | Si | | | | | | | | COP1 film | thermocompression bonding | C |

*[1]COP1 is a cycloolefin polymer (JSR Corporation, Arton (trademark))

TABLE 4

| | Thermally-Modified Polymer Layer | | | | | | | | | |
|---|---|---|---|---|---|---|---|---|---|---|
| | | Raw Material | | | Forming Conditions | | | | Polymer Member | Cross-Cut Test Results |
| | | | | | First Thermally-Modified Polymer Layer | | Second Thermally-Modified Polymer Layer | | | |
| | Inorganic Substrate | Solvent | Polymer | Concentration (mass %) | Temperature (° C.) | Time (min) | Temperature (° C.) | Time (min) | Raw Material | Joining Method | |
| Example 10 | Si | chloroform | COP1*[1] | 7 | 360 | 1 | | | COP1 | spin coating | B |
| Example 11 | Si | chloroform | COP1 | 7 | 320 | 1 | | | COP1 | spin coating | B |
| Example 12 | Si | chloroform | COP1 | 7 | 280 | 1 | | | COP1 | spin coating | B |
| Example 13 | Si | chloroform | COP1 | 7 | 240 | 1 | | | COP1 | spin coating | B |
| Example 14 | Si | chloroform | COP1 | 7 | 200 | 1 | | | COP1 | spin coating | B |
| Comparative Example 1 | Si | | | | | | | | COP1 | spin coating | C |

*[1]COP1 is a cycloolefin polymer (JSR Corporation, Arton (trademark))

TABLE 5

| | Thermally-Modified Polymer Layer | | | | | | | | | |
|---|---|---|---|---|---|---|---|---|---|---|
| | | Raw Material | | | Forming Conditions | | | | | |
| | | | | | First Thermally-Modified Polymer Layer | | Second Thermally-Modified Polymer Layer | | | |
| | Inorganic Substrate | Solvent | Polymer | Concentration (mass %) | Temperature (° C.) | Time (min) | Temperature (° C.) | Time (min) | Raw Material | Joining Method | Cross-Cut Test Results |
| Example 15 | Si | toluene | COP2*[3] | 10 | 280 | 1 | 200 | 2 | COP2 | spin coating | A |
| Example 16 | Si | toluene | COP2 | 1 | 280 | 1 | 200 | 2 | COP2 | spin coating | A |
| Comparative Example 3 | Si | | | | | | | | COP2 | spin coating | C |

*[3]COP2 is a cycloolefin polymer (Zeon Corporation, Zeonex (trademark) 480R)

TABLE 6

| | Inorganic Substrate | Raw Material | | | Forming Conditions | | | | Polymer Member | | Cross-Cut Test Results |
| | | Solvent | Polymer | Concentration (mass %) | First Thermally-Modified Polymer Layer Temperature (° C.) | Time (min) | Second Thermally-Modified Polymer Layer Temperature (° C.) | Time (min) | Raw Material | Joining Method | |
|---|---|---|---|---|---|---|---|---|---|---|---|
| Example 17 | Si | Toluene | COP2*[3] | 10 | 360 | 1 | 200 | 2 | COP2 | spin coating | B |
| Example 18 | Si | Toluene | COP2 | 10 | 320 | 1 | 200 | 2 | COP2 | spin coating | B |
| Example 15 | Si | Toluene | COP2 | 10 | 280 | 1 | 200 | 2 | COP2 | spin coating | A |
| Example 19 | Si | Toluene | COP2 | 10 | 240 | 1 | 200 | 2 | COP2 | spin coating | B |
| Example 20 | Si | Toluene | COP2 | 10 | 200 | 1 | 200 | 2 | COP2 | spin coating | B |
| Comparative Example 3 | Si | | | | | | | | COP2 | spin coating | C |

*[3] COP2 is a cycloolefin polymer (Zeon Corporation, Zeonex (trademark) 480R)

TABLE 7

| | Inorganic Substrate | Raw Material | First Thermally-Modified Polymer Layer Temperature (° C.) | Time (min) | Second Thermally-Modified Polymer Layer Temperature (° C.) | Time (min) | Polymer Member | | Cross-Cut Test Results |
| | | | | | | | Raw Material | Joining Method | |
|---|---|---|---|---|---|---|---|---|---|
| Example 21 | Si | PE film*[4] | 280 | 1 | 200 | 2 | PE film | thermocompression bonding | A |
| Comparative Example 4 | Si | | | | | | PE film | thermocompression bonding | C |

*[4] PE Film is a polyethylene film (thickness: 30 μm).

TABLE 8

| | Inorganic Substrate | Raw Material | | | Forming Conditions | | | | Polymer Member | | Cross-Cut Test Results |
| | | Solvent | Polymer | Concentration (mass %) | First Thermally-Modified Polymer Layer Temperature (° C.) | Time (min) | Second Thermally-Modified Polymer Layer Temperature (° C.) | Time (min) | Raw Material | Joining Method | |
|---|---|---|---|---|---|---|---|---|---|---|---|
| Example 22 | Si | chloroform | COP1*[1] | 7 | 280 | 1 | 200 | 2 | COP2 | spin coating | B |
| Example 23 | Si | chloroform | COP1 | 7 | 280 | 1 | 200 | 2 | PE film | thermocompression bonding | B |
| Example 24 | Si | Toluene | COP2*[3] | 10 | 280 | 1 | 200 | 2 | COP1 | spin coating | A |
| Example 25 | Si | Toluene | COP2 | 10 | 280 | 1 | 200 | 2 | PE film | thermocompression bonding | B |
| Example 26 | Si | | PE film*[4] | | 280 | 1 | 200 | 2 | COP1 | spin coating | B |
| Example 27 | Si | | PE film | | 280 | 1 | 200 | 2 | COP2 | spin coating | B |
| Comparative Example 1 | Si | | | | | | | | COP1 | spin coating | C |
| Comparative Example 3 | Si | | | | | | | | COP2 | spin coating | C |
| Comparative Example 4 | Si | | | | | | | | PE film | thermocompression bonding | C |

TABLE 8-continued

| | | | Thermally-Modified Polymer Layer | | | | | | | |
|---|---|---|---|---|---|---|---|---|---|---|
| | | Raw Material | | Forming Conditions | | | | Polymer Member | | Cross-Cut Test Results |
| | | | | First Thermally-Modified Polymer Layer | | Second Thermally-Modified Polymer Layer | | | | |
| Inorganic Substrate | Solvent | Polymer | Concentration (mass %) | Temperature (° C.) | Time (min) | Temperature (° C.) | Time (min) | Raw Material | Joining Method | |

*[1]COP1 is a cycloolefin polymer (JSR Corporation, Arton (trademark))
*[3]COP2 is a cycloolefin polymer (Zeon Corporation, Zeonex (trademark) 480R)
*[4]PE Film is a polyethylene film (thickness: 30 μm).

TABLE 9

| | | Raw Material | | | Forming Conditions | | | | Polymer Member | | Cross-Cut Test Results |
|---|---|---|---|---|---|---|---|---|---|---|---|
| | | | | | First Thermally-Modified Polymer Layer | | Second Thermally-Modified Polymer Layer | | | | |
| | Inorganic Substrate | Solvent | Polymer | Concentration (mass %) | Temperature (° C.) | Time (min) | Temperature (° C.) | Time (min) | Raw Material | Joining Method | |
| Example 28 | SiN | toluene | COP2*[3] | 10 | 280 | 1 | 200 | 2 | COP2 | spin coating | A |
| Comparative Example 5 | SiN | | | | | | | | COP2 | spin coating | C |
| Example 29 | Cu | toluene | COP2 | 10 | 280 | 1 | 200 | 2 | COP2 | spin coating | A |
| Comparative Example 6 | Cu | | | | | | | | COP2 | spin coating | C |
| Example 30 | Al | toluene | COP2 | 10 | 280 | 1 | 200 | 2 | COP2 | spin coating | A |
| Comparative Example 7 | Al | | | | | | | | COP2 | spin coating | C |

*[3]COP2 is a cycloolefin polymer (Zeon Corporation, Zeonex (trademark) 480R)

TABLE 10

| | | Raw Material | | | Forming Conditions | | | | Polymer Member | | Cross-Cut Test Results |
|---|---|---|---|---|---|---|---|---|---|---|---|
| | | | | | First Thermally-Modified Polymer Layer | | Second Thermally-Modified Polymer Layer | | | | |
| | Inorganic Substrate | Solvent | Polymer | Concentration (mass %) | Temperature (° C.) | Time (min) | Temperature (° C.) | Time (min) | Raw Material | Joining Method | |
| Comparative Example 8 | OTS-treated Si | | | | | | | | COP2*[3] | spin coating | C |
| Comparative Example 9 | OTS-treated Si | | | | | | | | PE film*[4] | thermocompression bonding | C |
| Comparative Example 10 | PTS-treated Si | | | | | | | | COP2 | spin coating | C |
| Comparative Example 11 | PTS-treated Si | | | | | | | | PE film | thermocompression bonding | C |
| Comparative Example 12 | ATS-treated Si | | | | | | | | COP2 | spin coating | C |
| Comparative Example 13 | ATS-treated Si | | | | | | | | PE film | thermocompression bonding | C |

*[3]COP2 is a cycloolefin polymer (Zeon Corporation, Zeonex (trademark) 480R)
*[4]PE Film is a polyethylene film (thickness: 30 μm).

<Evaluation Results>

It is understood from Table 1 that when the polymer concentration in the polymer solution for forming the thermally-modified polymer layer is from 1 mass % to 7 mass % and the rotation speed of spin coating during the formation of the thermally-modified polymer layer is from 2,000 to 4,000 rpm (Examples 1 to 4), separation of the polymer member is suppressed, compared with the case of not using a thermally-modified polymer layer (Comparative Example 1).

It is also understood from Table 1 that not only in the case of forming two thermally-modified polymer layers (Examples 1 to 4) but also in the case of forming three thermally-modified polymer layers (Example 3A), separation of the polymer member is suppressed, compared with the case of not using a thermally-modified polymer layer (Comparative Example 1).

It is understood from Table 2 that when the thermal modification temperature for forming the thermally-modified polymer layer is a temperature of 200 to 360° C. (Examples 1 and 5 to 8), separation of the polymer member is suppressed, compared with the case of not using a thermally-modified polymer layer (Comparative Example 1).

It is understood from Table 3 that when the polymer member film is joined by thermocompression bonding to the thermally-modified polymer (Example 9), separation of the polymer member is suppressed, compared with the case of joining the polymer member film by thermocompression bonding directly to the silicon substrate without using a thermally-modified polymer layer (Comparative Example 2).

It is understood from Table 4 that even when only one thermally-modified polymer layer is used without forming two thermally-modified polymer layers (Examples 10 to 14), separation of the polymer member is suppressed, compared with the case of not using a thermally-modified polymer layer (Comparative Example 1).

It is understood from Table 5 that when the polymer concentration in the polymer solution for forming the thermally-modified polymer layer is from 1 mass % to 10 mass % (Examples 15 and 16), separation of the polymer member is suppressed, compared with the case of not using a thermally-modified polymer layer (Comparative Example 3).

It is understood from Table 6 that when the thermal modification temperature for forming the thermally-modified polymer layer is a temperature of 200 to 360° C. (Examples 10 and 17 to 20), separation of the polymer member is suppressed, compared with the case of not using a thermally-modified polymer layer (Comparative Example 3).

It is understood from Table 7 that when the polymer member film is joined by thermocompression bonding to the thermally-modified polymer (Example 21), separation of the polymer member is suppressed, compared with the case of joining the polymer member film by thermocompression bonding directly to the silicon substrate without using a thermally-modified polymer layer (Comparative Example 4).

It is understood from Table 8 that even under the condition where the polymer for forming the thermally-modified polymer layer is different from the polymer for forming the polymer member, when a thermally-modified polymer layer is used (Examples 22 to 27), separation of the polymer member is suppressed, compared with the case of not using a thermally-modified polymer layer (Comparative Examples 1, 3 and 4).

It is understood from Table 9 that even under the condition where the substrate is not a silicon substrate but is a silicon substrate having SiN on the surface, a copper sheet or an aluminum sheet, when a thermally-modified polymer layer is used (Examples 28 to 30), separation of the polymer member is suppressed, compared with the case of not using a thermally-modified polymer layer (Comparative Examples 5 to 7).

It is understood from Table 10 that when the substrate is a silicon substrate treated with a silane coupling agent, separation of the polymer member is not suppressed, compared with the case of using a thermally-modified polymer layer (Examples).

Example 31 to 36

Using a silicon substrate as the inorganic substrate, silicon substrates with a thermally-modified polymer layer were obtained in the same manner as in Example 1 except that the solution for thermally-modified polymer layer is obtained by mixing and stirring 20 mass % of COP1 and 80 mass % of chloroform at room temperature, and that the temperature of the hot plate for thermal modification was changed to 400° C. (Example 31), 320° C. (Example 32), 280° C. (Example 33), 240° C. (Example 34), 200° C. (Example 35), and 160° C. (Example 36).

(Elemental Analysis by XPS)

With respect to the thermally-modified polymer layers of Examples 31 to 36, the ratio of the number of oxygen atoms contained in the thermally-modified polymer layer to the total of the number of oxygen atoms and carbon atoms contained in the thermally-modified polymer layer (number of O atoms/(number of O atoms+number of C atoms) (%)) was determined using an XPS apparatus (K-Alpha (Thermo Fisher Scientific K.K.)).

The measurement was performed using monochromatic AlKα ray as the X-ray source with a photoelectron takeoff angle of 0°. The O1s peak area was determined by drawing the baseline in the range of 527 to 537 eV according to the Shirley method, and the C1s peak area was determined by drawing the baseline in the range of 280 to 290 eV according to the Shirley method. The oxygen concentration and the oxygen concentration of the film surface were determined by correcting the O1s peak area and C1s peak area by use of the sensitivity coefficient specific to each apparatus.

Preparation conditions and evaluation results of these thermally-modified polymer layers are shown in Table 11 below. It is understood from Table 11 that the ratio (number of 0 atoms/(number of 0 atoms+number of C atoms) (%)) is smaller as the temperature for thermal modification lowers, i.e., the degree of thermal modification decreases, and accordingly, this ratio can be utilized as an indicator indicating the degree of thermal modification of the thermally-modified polymer layer.

(Infrared Absorption Spectrum Measurement)

With respect to the thermally-modified polymer layers of Examples 31 to 36, the infrared transmission absorption spectrum in the range of 4,000 to 500 $cm^{-1}$ was measured using an IR absorption analyzer (Nicolet 6700 (Thermo Fisher SCIENTIFIC K.K.)) to determine the ratio of the intensity of absorption peak of C=O stretching vibration with the peak at 1,732 $cm^{-1}$ to the intensity of absorption peak of C—H stretching vibration with the peak at 2,947 $cm^{-1}$ (intensity of absorption peak of C=O stretching vibration/intensity of absorption peak of C—H stretching vibration (-)). The intensity of absorption peak was determined by reading the maximum value of absorbance of the absorption peak.

Preparation conditions and evaluation results of these thermally-modified polymer layers are shown in Table 11 below. It is understood from Table 11 that the ratio (intensity of absorption peak of C=O stretching vibration/intensity of absorption peak of C—H stretching vibration (-)) is smaller as the temperature for thermal modification lowers, i.e., the degree of thermal modification decreases, and accordingly, this ratio can be utilized as an indicator indicating the degree of thermal modification of the thermally-modified polymer layer.

TABLE 11

|  | Thermally-Modified Polymer Layer | | | | | | |
|---|---|---|---|---|---|---|---|
|  | Raw Material | | | Forming Conditions | | Number of O Atoms/ | |
|  | Inorganic Substrate | Solvent | Polymer | Polymer Concentration (mass %) | Temperature (° C.) | Time (min) | (Number of O Atoms + Number of C Atoms) (%) | Ratio of Absorption Intensities (—) |
| Example 31 | Si | chloroform | COP1 | 20 | 400 | 1 | (not measured) | 3.10 |
| Example 32 | Si | chloroform | COP1 | 20 | 320 | 1 | 7.1 | 0.25 |
| Example 33 | Si | chloroform | COP1 | 20 | 280 | 1 | 6.3 | 0.22 |
| Example 34 | Si | chloroform | COP1 | 20 | 240 | 1 | 0.1 | 0 |
| Example 35 | Si | chloroform | COP1 | 20 | 200 | 1 | 0.1 | 0 |
| Example 36 | Si | chloroform | COP1 | 20 | 160 | 1 | (not measured) | 0 |

REFERENCE SIGNS LIST

10 Inorganic substrate
20, 21 First thermally-modified polymer layer
22 Second thermally-modified polymer layer
30 Polymer member
110, 120 Composite of thermally-modified polymer layer and inorganic substrate of the present invention
210, 220 Composite of polymer member and inorganic substrate of the present invention

The invention claimed is:

1. A composite of thermally-modified polymer layer and inorganic substrate, wherein thermally-modified polymer layers are bonded to an inorganic substrate,
   wherein the thermally-modified polymer layers contain at least a first thermally-modified polymer layer directly bonded to the inorganic substrate and a second thermally-modified polymer layer bonded to the first thermally-modified polymer layer,
   wherein a degree of thermal modification of the first thermally-modified polymer layer is such that the ratio of the number of oxygen atoms contained in the first thermally-modified polymer layer to the total of the number of oxygen atoms and carbon atoms contained in the first thermally-modified polymer layer as measured by X-ray photoelectron spectroscopy (XPS) is 0.5% or more and 30% or less,
   wherein a degree of thermal modification of the second thermally-modified polymer layer is such that the ratio of the number of oxygen atoms contained in the second thermally-modified polymer layer to the total of the number of oxygen atoms and carbon atoms contained in the second thermally-modified polymer layer as measured by X-ray photoelectron spectroscopy (XPS) is 0.3% or more and 20% or less,
   wherein the degree of thermal modification of the second thermally-modified polymer layer is smaller than the degree of thermal modification of the first thermally-modified polymer layer, and
   wherein the inorganic substrate is selected from the group consisting of semimetals, oxides of metals and semimetals, nitrides of metals and semimetals, carbides of metals and semimetals, carbon materials, and combinations thereof, wherein the semimetals are silicon and germanium
   and wherein both of the first and second thermally-modified polymer layers are formed of an olefin polymer and are a polymer layer oxidized by heating in an oxygen-containing atmosphere.

2. The composite according to claim 1, wherein the thermally-modified polymer layers further contain a third thermally-modified polymer layer bonded to the second thermally-modified polymer layer.

3. The composite according to claim 1, wherein the first thermally-modified polymer layer has a thickness of 1 nm or more and 30 μm or less.

4. The composite according to claim 1, wherein the inorganic substrate is selected from the group consisting of silicon, germanium, and diamond, and combinations thereof.

5. A composite of polymer member and inorganic substrate, wherein a polymer member is bonded to the inorganic substrate via the thermally-modified polymer layers of the composite of thermally-modified polymer layer and inorganic substrate according to claim 1.

6. The composite according to claim 5, wherein the polymer member is in a film shape.

7. The composite according to claim 5, wherein the polymer member is formed of an olefin polymer.

8. The composite according to claim 7, wherein, with regard to the first and second thermally-modified polymer layers and the polymer member, the olefin polymer is a cycloolefin polymer.

9. A method for producing the composite of thermally-modified polymer layer and inorganic substrate according to claim 1, comprising:
   forming a first polymer layer on the inorganic substrate, and heating the first polymer layer so that the first thermally-modified polymer layer is formed and the first thermally-modified polymer is bonded onto the inorganic substrate, and
   forming a second polymer layer on the first thermally-modified polymer layer after the formation of the first thermally-modified polymer layer, and heating the second polymer layer so that the second thermally-modified polymer layer is formed and the second thermally-modified polymer layer is bonded onto the first thermally-modified polymer layer.

10. The method according to claim 9, further comprising:

forming a third polymer layer on the second thermally-modified polymer layer after the formation of the second thermally-modified polymer layer, and heating the third polymer layer so that a third thermally-modified polymer layer is formed and the third thermally-modified polymer layer is bonded onto the second thermally-modified polymer layer.

11. The method according to claim 10, wherein the degree of thermal modification of the third thermally-modified polymer layer is smaller than the degree of thermal modification of the second thermally-modified polymer layer.

12. The method according to claim 9, wherein the first polymer layer is formed by coating and/or thermocompression bonding.

13. A method for producing a composite polymer member and inorganic substrate comprising:

producing the composite of thermally-modified polymer layer and inorganic substrate by the method according to claim 9, and joining a polymer member to the thermally-modified polymer layers so that the polymer member is joined to the inorganic substrate via the thermally-modified polymer layers.

14. The method according to claim 13, wherein the polymer member is in a film shape.

15. The method according to claim 13, wherein joining of the polymer member is performed by coating or thermocompression bonding.

16. The method according to claim 13, wherein the polymer member is formed of an olefin polymer.

17. The method according to claim 16, wherein with regard to the first and second thermally-modified polymer layers and the polymer member, the olefin polymer is a cycloolefin polymer.

* * * * *